(12) United States Patent
Goodman

(10) Patent No.: US 11,540,540 B2
(45) Date of Patent: Jan. 3, 2023

(54) COLD SMOKED MEAT PRODUCT AND METHOD OF MAKING SAME

(71) Applicant: Fish Pro Grow, LLC, Bethesda, MD (US)

(72) Inventor: Ronald N. Goodman, Rockville, MD (US)

(73) Assignee: Fish Pro Grow, LLC, Bethesda, MD (US)

( * ) Notice: Subject to any disclaimer, the term of this patent is extended or adjusted under 35 U.S.C. 154(b) by 307 days.

(21) Appl. No.: 15/940,443

(22) Filed: Mar. 29, 2018

(65) Prior Publication Data

US 2019/0200655 A1 Jul. 4, 2019

Related U.S. Application Data

(60) Provisional application No. 62/611,256, filed on Dec. 28, 2017.

(51) Int. Cl.

| | |
|---|---|
| *A23L 13/70* | (2016.01) |
| *A23L 17/00* | (2016.01) |
| *A23B 4/044* | (2006.01) |
| *A23B 4/03* | (2006.01) |
| *A23L 13/40* | (2016.01) |
| *A23B 4/06* | (2006.01) |
| *A23B 4/052* | (2006.01) |

(52) U.S. Cl.
CPC ............... *A23L 13/72* (2016.08); *A23B 4/03* (2013.01); *A23B 4/044* (2013.01); *A23B 4/052* (2013.01); *A23B 4/06* (2013.01); *A23L 13/42* (2016.08); *A23L 13/70* (2016.08); *A23L 17/00* (2016.08); *A23V 2002/00* (2013.01)

(58) Field of Classification Search
CPC .......... A23L 13/70; A23L 13/72; A23L 13/74; A23B 4/06; A23B 4/044; A23B 4/052
See application file for complete search history.

(56) References Cited

U.S. PATENT DOCUMENTS

| | | |
|---|---|---|
| 4,239,785 A | 12/1980 | Roth |
| 4,868,002 A | 9/1989 | Scaglione |
| 5,290,584 A | 3/1994 | Ray |
| 5,731,029 A | 3/1998 | Karwowski |
| 2012/0015074 A1 | 1/2012 | Draganski |
| 2013/0084372 A1 | 4/2013 | Lipinski |

FOREIGN PATENT DOCUMENTS

| | | | |
|---|---|---|---|
| CN | 1318321 A | | 10/2001 |
| CN | 106490514 A | | 3/2017 |
| EP | 2742809 A1 | | 6/2014 |
| JP | S59143544 A | * | 8/1984 |
| JP | 2006061096 A | | 3/2006 |
| JP | 2009273403 A | * | 11/2009 |
| TW | 201613490 A | * | 4/2016 |

OTHER PUBLICATIONS

Doe, chapter 2-3 in "Fishing Drying & Smoking Production and Quality", Taylor & Francis, 1998, p. 13-87 (Year: 1998).*
International Searching Authority, International Search Report and Written Opinion for application PCT/US2018/025214, dated Jun. 8, 2018, 11 pages.

* cited by examiner

*Primary Examiner* — Changqing Li
(74) *Attorney, Agent, or Firm* — Quarles & Brady, LLP

(57) ABSTRACT

The present disclosure relates to a flavored jerky product and a method of preparing a flavored jerky product. The method comprises applying a curing agent to an external skin surface and/or an exposed muscle surface of a meat source, curing the meat source with the curing agent, and drying, cold smoking, and drying both the external skin surface and the meat source. The meat source is then chilled, the external skin surface is removed, and the meat source is sliced and/or segmented into a meat portion. The meat portion is marinated in a marinade solution, and then dried, cold smoked and dried to attain a water activity between about 0.7 and about 0.9 to produce the flavored jerky product.

16 Claims, No Drawings

COLD SMOKED MEAT PRODUCT AND METHOD OF MAKING SAME

CROSS-REFERENCE TO RELATED APPLICATIONS

This application claims the benefit of U.S. Provisional Patent Application 62/611,256, filed Dec. 28, 2017, which is incorporated by reference herein in its entirety for all purposes.

STATEMENT REGARDING FEDERALLY SPONSORED RESEARCH

Not Applicable.

BACKGROUND

Jerky is a type of preserved meat product that has been cured and dried to prevent spoilage. Modern production of jerky can be separated into two categories: jerky produced from whole meat and sliced into strips, and jerky produced from meat that has been ground and pulverized into a smaller product. In each case, the meat is typically trimmed of fat and marinated in a curing solution that contains water, seasonings, sugars, and curing agents such as salt and sodium nitrate. Salt is used to dehydrate the meat, and the sodium nitrate helps to retain the color of the meat and reduce rancidity. After curing, the meat is then typically smoked at high temperatures and dried to reach a final moisture content. Ground meat typically includes an additional process step of extruding the meat into a desired shape prior to smoking and drying.

Known meat jerky products have a limited shelf life before the flavor becomes less desirable, is thick and/or opaque, and/or suffers from a tough or chewy texture.

Currently, there is a need in the art for a new process for manufacturing jerky that stabilizes and extends shelf life, enhances flavor, increases visual appeal, improves tenderness or texture, and simplifies the manufacturing process.

SUMMARY OF THE DISCLOSURE

Certain embodiments of the present disclosure substantially overcome the aforementioned drawbacks by providing a novel and non-obvious method for preparing a flavored jerky product.

An embodiment of the present invention is a method of preparing a flavored jerky product comprising the steps of applying a curing agent to at least one of an external skin surface and an exposed muscle surface of a meat source, curing the meat source with a curing agent, and cold smoking the meat source in a first cold smoking step. The method further comprises chilling the meat source, removing the external skin surface from the meat source, if present, and slicing or segmenting the meat source into a meat portion. The method further comprises marinating the meat portion in a marinade solution, and cold smoking the meat portion in a second cold smoking step. In one embodiment at least one of the first and second cold smoking steps is performed in a smoker. An embodiment of the present invention is a flavored jerky product made by the disclosed method.

In an embodiment the meat portion attains a water activity between about 0.7 and about 0.9 following the second cold smoking step. In an embodiment the meat source comprises fish. In an embodiment the fish is salmon.

In an embodiment the method comprises the step of drying the meat source between the curing step and the first cold smoking step. In an embodiment the method comprises the step of drying the meat source between the first cold smoking step and the chilling step. In an embodiment the method comprises the step of drying the meat portion between the marinating step and the second cold smoking step. In an embodiment the method comprises the step of drying the meat portion after the second cold smoking step. In an embodiment at least one of drying steps is performed in a smoker. In an embodiment at least one of drying steps is performed outside a smoker.

In an embodiment at least one of the first and second cold smoking steps is performed at a temperature of about 16° C. to about 38° C. In one embodiment the chilling step is performed at a temperature of about 1° C. to about 5° C. In an embodiment the marinade solution comprises a live culture, and in an embodiment the live culture comprises *Aspergillus oryzae* (Koji).

In an embodiment the marinade solution comprises at least one of a seasoning agent, an antioxidant, a starch containing flour, a traditional sugar, an invert sugar, and an emulsifier. In an embodiment the antioxidant comprises at least one of rosemary, green tea, green tea extracts, derivatives and mixtures thereof. In an embodiment the seasoning agent comprises at least one of miso, soya, molasses, honey, brown sugar, maple syrup, natural flavors derived from lemon or black pepper, a spice, a starch containing flour, espresso powder, assorted peppers, dehydrated orange peel, sesame seeds, ginger, and derivatives and mixtures thereof. In an embodiment the emulsifier comprises lecithin.

An embodiment of the present invention is a method of preparing a flavored jerky product. The method comprises applying a curing agent to at least one of an external skin surface or an exposed muscle surface of a meat source, curing the meat source with the curing agent, and cold smoking the meat source in a first cold smoking step. The method further comprises the steps of chilling the meat source, removing the external skin surface from the meat source, if present, slicing or segmenting the meat source into a meat portion, marinating the meat portion in a marinade solution having a live culture, and cold smoking the meat portion in a second cold smoking step. In an embodiment the live culture is *Aspergillus oryzae* (Koji). In an embodiment the marinating step is performed at a temperature of about 20° C. to about 32° C.

An embodiment of the present invention is a method of preparing a flavored jerky product. The method comprises applying a curing agent to at least one of an external skin surface or an exposed muscle surface of a meat source, curing the meat source with the curing agent, and cold smoking the meat source in a first cold smoking step. The method further comprises the steps of drying the meat source, chilling the meat source, removing the external skin surface from the meat source, if present, and slicing or segmenting the meat source into a meat portion. The method further comprises the steps of marinating the meat portion in a marinade solution comprising a live culture, cold smoking the meat portion in a second cold smoking step, and drying the meat portion. In an embodiment following the second cold smoking and drying steps the meat portion attains a water activity between about 0.7 and about 0.9. In an embodiment the live culture is *Aspergillus oryzae* (Koji).

In one aspect, the disclosure provides a flavored jerky product made by any one of the methods disclosed above.

The foregoing and other aspects and advantages of the present invention will appear from the following description.

DETAILED DESCRIPTION

A method is provided for preparing a flavored jerky product. In an embodiment, the method comprises applying a curing agent to an external surface of a meat source and wet and/or dry curing the meat source with the curing agent. In an embodiment the meat source is chilled to a temperature of about 1° C. to about 5° C. before the step of applying the curing agent. Next, the meat source undergoes a first cold smoking step. By way of non-limiting example, if the meat source is a fish, the whole skin-on filet/side is cold smoked. In an embodiment the meat source or meat portion is smoked in a "smoker," a variety of which are known to those of ordinary skill in the art. In one embodiment, the meat source may be smoked using liquid smoke, a burning or smoldering material, such as wood, or by another approved smoke generating source, and the like.

In an embodiment, the meat source is then equilibrated with reference to the salt and moisture levels. In an embodiment, salt and moisture levels are equilibrated substantially evenly through the matrix of the meat source. During equilibration the meat source is also chilled to less than or equal to a temperature of about 1° C. to about 5° C. and remains chilled during the following slicing or segmenting step, wherein the meat source is sliced or segmented into at least one meat portion.

In an embodiment, following the first cold smoking step and prior to the slicing step, the external skin surface is removed from the meat source. The meat portion is then marinated in a marinade solution comprising at least one seasoning agent, and smoked in a second cold smoking step. At least one of the cold smoking steps is performed at a temperature of between about 16° C. to about 38° C., about 17° C. to about 35° C., about 18° C. to about 32° C., about 19° C. to about 29° C., about 20° C. to about 26° C., and preferably about 21° C. to about 23° C.

In an embodiment following the second cold smoking step the meat portion is equilibrated to room temperature (commonly about 15° C. to about 25° C.) to produce the flavored jerky product. In another embodiment the meat portion is chilled to a temperature of about 1° C. to about 5° C. to produce the flavored jerky product. In an embodiment the method comprises the step of drying the meat source between the curing step and the first cold smoking step. In an embodiment the method comprises the step of drying the meat source between the first cold smoking step and the chilling step. In an embodiment the method comprises the step of drying the meat portion between the marinating step and the second cold smoking step. In an embodiment the method comprises the step of drying the meat portion after the second cold smoking step. In some embodiments various combinations of drying steps are used. In an embodiment at least one of drying steps is performed in a smoker. In an embodiment at least one of drying steps is performed outside a smoker.

In another embodiment, a method is provided for preparing a flavored jerky product. By way of example, the method comprises applying a curing agent to a meat source, and wet or dry curing the meat source with the curing agent. Next, the meat source undergoes a first cold smoking step. In an embodiment, the meat source is then equilibrated and chilled and subsequently undergoes a slicing or segmenting step to create a meat portion. The meat portion is then marinated in a marinade solution. In one embodiment the marinade solution comprises a live culture. The meat portion then undergoes a second cold smoking step. In an embodiment, the meat portion attains a water activity of between about 0.5 to about 1.1, about 0.6 to about 1.0, and preferably between about 0.7 to about 0.9, and more preferably between about 0.8 to about 0.9, and in one embodiment between about 0.80 to about 0.85.

In an embodiment the method comprises the step of drying the meat source between the curing step and the first cold smoking step. In an embodiment the method comprises the step of drying the meat source between the first cold smoking step and the chilling step. In an embodiment the method comprises the step of drying the meat portion between the marinating step and the second cold smoking step. In an embodiment the method comprises the step of drying the meat portion after the second cold smoking step. In an embodiment at least one of drying steps is performed in a smoker. In an embodiment at least one of drying steps is performed outside a smoker.

In an embodiment, a flavored jerky product is disclosed. The flavored jerky product comprises a meat portion having a water activity between about 0.5 to about 1.1, to about 0.6 to about 1.0, and preferably between about 0.7 to about 0.9, and more preferably between about 0.8 to about 0.9, and in one embodiment between about 0.80 to about 0.85 and a microstructure comprising seasoning agents entrained therein. The microstructure of the meat portion is prepared by applying a curing agent to a surface of the meat source, which in an embodiment is the exposed muscle surface, in an embodiment is the external skin surface, and in an embodiment both the external skin surface and the exposed muscle surface of a meat source is cured with a curing agent, and smoking the meat source in a first cold smoking step. In an embodiment the external skin surface is removed, and the meat source is sliced or segmented into a meat portion. The meat portion is then marinated in a marinade solution comprising at least one seasoning agent, and smoked in a second cold smoking step to attain the flavored jerky product.

According to an embodiment, the method of preparing a flavored jerky product comprises providing a meat source to be processed. Suitable meat sources for producing the flavored jerky product may include, for example, red meat, poultry, pork, and seafood. Exemplary meat sources may include, but are not limited to, beef, chicken, turkey, goat, lamb, bison, salmon, tuna, and the like. Moreover, the present disclosure provides a method for preparing a flavored jerky product with improved flavor, stability (shelf life), visual appeal, and tenderness (texture).

In an embodiment, a curing agent is applied to the meat source for a specified curing time. In one embodiment, the curing agent is applied to an external skin surface of the meat source, i.e. mammalian skin or fish skin. The fish skin can be either with or without scales. In an embodiment, the curing agent is applied directly to an exposed muscle surface of the meat source. In an embodiment, the curing agent is applied to both the external skin surface of the meat source and the exposed muscle surface of the meat source. In an embodiment the meat source is dry cured. In an embodiment the meat source is wet cured. In dry curing, the curing agent is applied, for example rubbed, directly to the surface of the meat source. Alternatively, wet curing includes placing the meat source in a solution comprising the curing agent. In some embodiments, wet curing may comprise injecting the curing agent into the meat source, i.e. by using a needle to puncture the meat. The specified curing time may take about 30 minutes or less, or between about 30 minutes to about 12 hours, and in some forms, the meat source may be cured for about 12 to about 36 hours, or longer.

Suitable curing agents include reagents that draw moisture out of the meat source through, for example, osmosis, and/or diffusion. In an embodiment, the curing agent comprises at least one of a salt, nitrate, nitrite, sugar, and the like. Non-limiting examples of curing agents may comprise dextrose, sugar, salt, corn syrup, hydrolyzed plant protein, sodium erythorbate (and/or one of its natural sources and/or analogs e.g., cherry powder), sodium nitrite (and/or one of its natural sources e.g., celery powder), mixtures and derivatives thereof.

After curing the meat source undergoes a first cold smoking step for a specified smoking time. In an embodiment, cold smoking may be performed at a temperature of about 16° C. to about 38° C., and in a preferred embodiment at a temperature of about 21° C. to about 23° C. The specified smoking time may be about 30 minutes or longer, while in other embodiments the specified smoking time ranges from about 6 to about 10 hours, or longer. Curing the meat source and subsequently cold smoking the meat source offers several advantages over currently known processes. For example, a first cold smoking step improves the flavor and firms the texture of the meat source allowing for a more precise slice, and surprisingly stabilizes the fats of the meat source. A first cold smoking step also results in a final product with a surprising and unexpected pleasing visual appeal, wherein the product is more translucent in appearance as opposed to the opaque appearance of known jerky products. A first cold smoking step also provides antioxidant effects equating to the increase in shelf-life of the meat product with regard to flavor and/or desirability. A first cold smoking step also increases processing speed as the first cold smoked slices are easier to handle than raw slices and therefore processing is faster, with the meat source subject to less fracturing resulting in a smaller, less desirable portion. In some embodiments, the meat source undergoes a drying step immediately before or immediately after the first cold smoking step, or both. The drying step(s) may be performed within or outside the smoker. If within the smoker, smoke is evacuated or otherwise removed from the smoker during the drying step(s).

The method of preparing a flavored jerky product further comprises slicing or segmenting the meat source into a meat portion. In an embodiment, slicing the meat source into a meat portion includes slicing the meat source into strips, and in an embodiment into thinly sliced strips. Alternatively, in an embodiment segmenting the meat source into a meat portion may include grinding and pulverizing the meat source into a meat slurry, although a more preferable embodiment is producing a natural whole muscle slice of the meat product. In the instance that the meat source is cured with an external skin surface, segmenting the meat source includes removing the external skin surface from the meat source prior to slicing.

The meat portion is then marinated in a marinade solution for a specified marinating time. The marinade solution comprises one or more agent(s) such as, but not limited to, a seasoning, an antioxidant, a starch containing flour, an emulsifier, and in one embodiment, a live culture. The marinade solution adds and stabilizes flavor, tenderizes the meat portion, increasing tenderness of the product, and extends the shelf life of the product. In an embodiment the flour component provides nourishment for the live culture and helps retain omega-3 oils within and on the surface of the meat portion.

The marinating time can take as little as about 30 minutes, while in some embodiments the meat portion can be marinated for longer than 30 minutes. In some embodiments the meat portion can be marinated for about 30 minutes to about 2 hours, and in some embodiments from about 2 hours to about 5 hours, or longer. In some embodiments, the marinade solution is cooled to a temperature of about 4° C. to about 25° C. In an embodiment of the marinade solution comprising a live culture the marinating temperature is about 18° C. to about 25° C., about 19° C. to about 24° C., about 20° C. to about 23° C., and in one embodiment between about 25° C. to about 33° C.

In an embodiment, the live culture comprises *Aspergillus oryzae*, also known as Koji or Koji mold. Koji is genomically well characterized and considered to be a safe organism for producing food enzymes because it lacks expressed sequence tags for genes responsible for aflatoxin production. Koji is a filamentous fungus that has an ability to secrete large amounts of hydrolytic enzymes, i.e. amylases and proteases that work to break down proteins in the meat portion and the starch in the starch containing flours. The use of Koji in the marinade solution assists in breaking down starches into various sugars and structural proteins in the meat portion resulting in a jerky product with an improved tenderness, extended shelf-life, and in addition acts as a flavoring agent. Enzymes produced by the Koji mold cleave at certain amino acids, exposing glutamate portions of the protein chain that stimulate umami receptors on the tongue.

In an embodiment Koji is used at a concentration of about 1% to about 3%, and in some embodiments from about 0.1% to about 1%, and in some embodiments from about 1% to about 3% and in some embodiments from about 3% to about 5% live culture per pound of meat source. Throughout the disclosure, all % are expressed as wt. %, unless specified otherwise. Using Koji has the surprising and unexpected result of improving the desired qualities of both tenderness, texture, and extending overall shelf-life, including the shelf life of the flavor profile. This unexpected result is provided by the first cold smoking step and partially due to the resultant lowering of the water activity ($A_w$), inhibiting oxidation. Applicant suggests that the live culture, specifically Koji, surprisingly may do the same, as some of its metabolites bind water. In many jerky products flavor is the first quality to suffer with time, usually due to lipid oxidation. Applicant's comparative organoleptic shelf-life studies confirm the unexpected property of extended shelf life of the product according to embodiments of the present invention.

Emulsifiers for the marinade solution may include reagents that stabilize the marinade solution by solubilizing the seasoning agents, and/or improve the release of flavors to the meat source. In an embodiment, the emulsifier comprises lecithin or the like. In an embodiment lecithin is used as soy is already an ingredient in the product, so no additional allergen declarations are needed, and it is known as a clean label ingredient. The use of the emulsifier is designed to help the meat tissue retain many of its beneficial properties. In the embodiment where the meat source is fish, and more particularly salmon, the emulsifier helps the tissue to retain as much of its own omega-3 containing oils as possible. The emulsifier is beneficial because as the fish approaches the necessary required food safety levels of water activity, it begins to lose some of its oil content.

Suitable antioxidants may include reagents that increase the shelf-life of the flavored jerky product. Some non-limiting examples include, but are not limited to, rosemary, rosemary extracts, green tea, green tea extracts, mixtures and derivatives thereof. Suitable seasonings may include, but are not limited to, miso, including, but not limited to white, yellow, red, or other miso, soya sauce, liquid shio koji, molasses, honey, brown sugar, rice or other starch containing flours, espresso powder, natural flavors derived from lemon or black pepper, common spices, derivatives and mixtures thereof. Non-limiting examples of common spices may include onion, garlic, pepper, paprika, nutmeg, mace, cloves, ginger, cardamom, chili, coriander, cumin, pimento, assorted peppers, dehydrated orange peel, sesame seeds, and the like. By way of example only, the sesame seeds may be black and yellow sesame seeds.

In some embodiments, the meat source undergoes a drying step immediately before or immediately after the first cold smoking step, or both. In some embodiments, the meat source undergoes a drying step immediately before or immediately after the second cold smoking step, or both. The drying step(s) may be performed within or outside the smoker. If within the smoker, smoke is evacuated or otherwise removed from the smoker during the drying step(s). The method further comprises drying the meat portion for a specified drying time. In an embodiment, drying the meat portion includes placing the meat portion in a conventional dryer, such as an oven, or continuous belt dryer, and the like.

In an embodiment the meat portion undergoes drying, cold smoking in a first cold smoking step, and drying. In one embodiment the meat portion undergoes drying, cold smoking in a second cold smoking step, and drying until the meat portion attains a water activity of between about 0.7 to about 0.9, or preferably about 0.8 to about 0.9, or more preferably between about 0.80 and about 0.85. In an embodiment the meat portion undergoes a repeated cycle of drying, cold smoking, and drying during either the first cold smoking step, the second cold smoking step, or both. The drying, cold smoking, drying first and/or second cold smoking steps may take about 30 minutes or more, while in other embodiments the specified first and/or second cold smoking steps may range between about 30 minutes and about 2 hours, and in some aspects between about 2 hours and about 12 hours, or more, depending on ambient humidity. Smoking the meat portion in the second cold smoking step offers several surprising and unexpected benefits to the product, including, but not limited to, increased desirable flavor, and extended shelf life.

In an embodiment the method comprises curing the meat source, cold smoking the meat source in a first cold smoking step, and equilibrating the meat source from a temperature of about 1° C. to about 5° C., thereby promoting the substantially even distribution of salt and water throughout the matrix of the meat source, and for better slicing quality and yield. In an embodiment, the first cold smoking step may be performed at a temperature of about 16° C. to about 38° C. The meat source is then chilled, sliced, marinated, and cold smoked in a second cold smoking step at a temperature of about 16° C. to about 38° C., with or without a subsequent drying step to achieve a safe water activity. In an embodiment the safe water activity is between about 0.80 and about 0.90, and preferably between about 0.8 and about 0.85. An embodiment may further comprise the step of skinning the meat source after the step of equilibrating the meat source.

The first cold smoking step unexpectedly and surprisingly stabilizes the flavor and fats, and increases the visual appeal of the jerky product. Known methods do not include a first cold smoking step and merely just slice and marinate the meat. The unexpected synergistic advantage arising from the first cold smoking step results in a superior jerky product.

In an embodiment, a flavored fish jerky product is disclosed. By way of non-limiting example, at least one of an external skin surface or an exposed muscle surface of a fish is cured, and the whole skin-on filet/(left or right) side is cold smoked. In one embodiment the exposed muscle portion of a skin-on fish fillet is cured.

In an embodiment, the fish is chilled to less than or equal to about 1.0° C. to about 5.0° C. following the first cold smoking step. Fish may include, but are not limited to salt or fresh water fish, and by way of non-limiting example salmon, and by further non-limiting example, Atlantic salmon. In an embodiment the whole skin-on fillet/left or right side undergoes a first cold smoking step, then equilibrated, chilled and then sliced.

The fish is then marinated in a marinade solution comprising at least one of a seasoning, a starch containing flour, an antioxidant, and an emulsifier. The emulsifier may include, but is not limited to, lecithin and the like. In some embodiments the marinade solution comprises at least one of a seasoning, an antioxidant, a starch containing flour, and an emulsifier. In an embodiment the marinade solution further comprises a live culture, and in one embodiment the live culture is Koji. The fish then undergoes a second cold smoking step and attains a water activity of between about 0.80 to about 0.85. In an embodiment the fish undergoes a drying step after the second cold smoking step. The product is then chilled or equilibrated to room temperature. In some embodiments, the meat source also undergoes a drying step immediately before the first cold smoking step, immediately after the first cold smoking step, or immediately before the second smoking step, or any combination thereof.

In one non-limiting example embodiment the curing agents and marinade solution may comprise the components exemplified in Table 1. Step 1 is defined as the curing step preceding the first cold smoking step, and step 2 is defined as the marinating step. The salt, and perhaps the sugar in a secondary role, along with the smoking during the first cold smoking step are the curing and stabilizing agents that stabilize the flavors throughout step 2 and the remainder of the process. This stabilization is due in part to the lowering of the water activity, thus inhibiting the water's contribution to lipid oxidation. Unexpectedly, this lowering of the water activity during the first cold smoking step, prior to the slicing, may disrupt many of the muscle cells thus increasing the probability of oxidation, essential to the stabilizing of the lipids and their delicate flavors, subsequently increasing shelf-life.

TABLE 1

| Ingredient | Step |
|---|---|
| Salt | 1 |
| Brown Sugar | 1 |
| Allspice | 1 |
| Black Pepper | 1 |
| Water | 2 |
| Maple Syrup | 2 |
| Honey | 2 |
| Molasses | 2 |
| Soya | |
| Black Pepper-Emulsion | 2 |
| Lemon Emulsion | 2 |
| Liquid Shio Koji | 2 |
| Rice Flour | 2 |
| Koji | 2 |
| Miso-White | 2 |
| Espresso powder | |
| Shichimi Togarashi | |
| Blend of Rosemary and Green Tea Extracts | 2 |

Koji is added at an initial concentration of about 0.1% to about 5% of meat and/or meat and marinade weight combined. Rice flour is added at an initial concentration of about 1% to about 3% of the meat product's weight or about 100% to about 300% of Koji's weight. The liquid shio Koji is added at an initial concentration of about 0.1% to about 5% of meat product weight. The blend of rosemary and green tea extracts is added at an initial concentration of about 0.025% to about 1% of meat and/or meat & marinade weight combined. In one embodiment Fortium® RGT WS 1500 liquid (Kemin® Industries, 1900 Scott Avenue Des Moines, Iowa USA 50317) is the source of the blend of rosemary and green tea extracts.

After the second cold smoking step the flavored jerky product is allowed to equilibrate to between about 1° C. and about room temperature (15° C. to 25° C.), preferably to a temperature of about 20° C. to about 23° C. The flavored jerky product may be packaged in an appropriate medium, such as, but not limited to, a high barrier bag. In one embodiment the high barrier bag includes a desiccant and/or oxygen absorber to improve preservation.

The present disclosure has described one or more preferred embodiments, and it should be appreciated that many equivalents, alternatives, variations, and modifications, aside from those expressly stated, are possible and within the scope of the invention.

The invention claimed is:

1. A method of preparing a flavored jerky product, the method comprising:
    applying a curing agent to at least one of an external skin surface and an exposed muscle surface of a skin-on meat source, wherein the curing agent comprises at least one agent selected from the group consisting of a salt, a nitrate, a nitrite, and a sugar and wherein the curing agent is configured to draw moisture out of the skin-on meat source;
    curing the skin-on meat source with the curing agent;
    cold smoking the skin-on meat source in a first cold smoking step at a temperature of about 16° C. to about 38° C. for a duration from about 6 hours to about 10 hours to stabilize the fats of the skin-on meat source;
    chilling the skin-on meat source;
    removing the external skin surface from the skin-on meat source to provide a skinless meat source;
    slicing or segmenting the skinless meat source into a skinless meat portion;
    marinating the skinless meat portion in a marinade solution, wherein the marinade solution is a liquid marinade comprising water and at least one agent selected from the group consisting of a seasoning, a starch, an antioxidant, and an emulsifier and wherein the marinade solution is configured to flavor and hydrate the skinless meat portion; and
    cold smoking the skinless meat portion in a second cold smoking step at a temperature of about 16° C. to about 38° C. for a duration of about 12 hours or more to provide the flavored jerky product, wherein the water activity of the flavored jerky product is between about 0.7 to about 0.9 upon the second cold smoking step,
    wherein the marinating step occurs after the first cold smoking step and before the second cold smoking step.

2. The method of claim 1, wherein the meat source comprises fish.

3. The method of claim 1, comprising a step of drying the skin-on meat source between the curing step and the first cold smoking step.

4. The method of claim 1, comprising a step of drying the skin-on meat source between the first cold smoking step and the chilling step.

5. The method of claim 1, comprising a step of drying the skinless meat portion between the marinating step and the second cold smoking step.

6. The method of claim 1, comprising a step of drying the flavored jerky product after the second cold smoking step.

7. The method of claim 1 wherein the chilling step is performed at a temperature of about 1° C. to about 5° C.

8. The method of claim 1, wherein the marinade solution comprises a live culture.

9. The method of claim 8, wherein the live culture comprises *Aspergillus oryzae* (Koji).

10. A method of preparing a flavored jerky product, the method comprising:
    applying a curing agent to at least one of an external skin surface or an exposed muscle surface of a skin-on meat source;
    curing the skin-on meat source with the curing agent;
    cold smoking the skin-on meat source in a first cold smoking step at a temperature of about 16° C. to about 38° C. for a duration from about 6 hours to about 10 hours to stabilize the fats of the skin-on meat source;
    chilling the skin-on meat source;
    removing the external skin surface from the skin-on meat source to provide a skinless meat source;
    slicing or segmenting the skinless meat source into a skinless meat portion;
    marinating the skinless meat portion in a marinade solution; and
    cold smoking the skinless meat portion in a second cold smoking step at a temperature of about 16° C. to about 38° C. for a duration of about 12 hours or more to provide the flavored jerky product, wherein the water activity of the flavored jerky product is between about 0.7 to about 0.9 upon the second cold smoking step,
    wherein the marinating step occurs after the first cold smoking step and before the second cold smoking step.

11. The method of claim 10, comprising a step of drying the skin-on meat source between the curing step and the first cold smoking step.

12. The method of claim 10, comprising a step of drying the skin-on meat source between the first cold smoking step and the chilling step.

13. The method of claim 10, comprising a step of drying the skinless meat portion between the marinating step and the second cold smoking step.

14. The method of claim 10, comprising a step of drying the flavored jerky product after the second cold smoking step.

15. The method of claim 10, wherein the step of marinating is performed at a temperature of about 20° C. to about 32° C.

16. A method of preparing a flavored jerky product, the method comprising:
    applying a curing agent to at least one of an external skin surface or an exposed muscle surface of a skin-on meat source, wherein the curing agent comprises at least one agent selected from the group consisting of a salt, a nitrate, a nitrite, and a sugar and wherein the curing agent is configured to draw moisture out of the skin-on meat source;
    curing the skin-on meat source with the curing agent;
    cold smoking the skin-on meat source in a first cold smoking step at a temperature of about 16° C. to about 38° C. for a duration from about 6 hours to about 10 hours to stabilize the fats of the skin-on meat source;

drying the skin-on meat source;

chilling the skin-on meat source;

removing the external skin surface from the skin-on meat source to provide a skinless meat source;

slicing or segmenting the skinless meat source into a skinless meat portion;

marinating the skinless meat portion in a marinade solution, wherein the marinade solution is a liquid marinade that comprises water, and at least one agent selected from the group consisting of a seasoning, a starch, an antioxidant, and an emulsifier, and wherein the marinade solution is configured to flavor and hydrate the skinless meat portion; and cold smoking the skinless meat portion in a second cold smoking step at a temperature of about 16° C. to about 38° C. for a duration of about 12 hours or more to provide the flavored jerky product, wherein the water activity of the flavored jerky product is between about 0.7 to about 0.9 upon the second cold smoking step, wherein the marinating step occurs after the first cold smoking step and before the second cold smoking step.

* * * * *